A. O. KUNERT.
TIRE FASTENER.
APPLICATION FILED SEPT. 18, 1919.
1,373,009.
Patented Mar. 29, 1921.
3 SHEETS—SHEET 1.
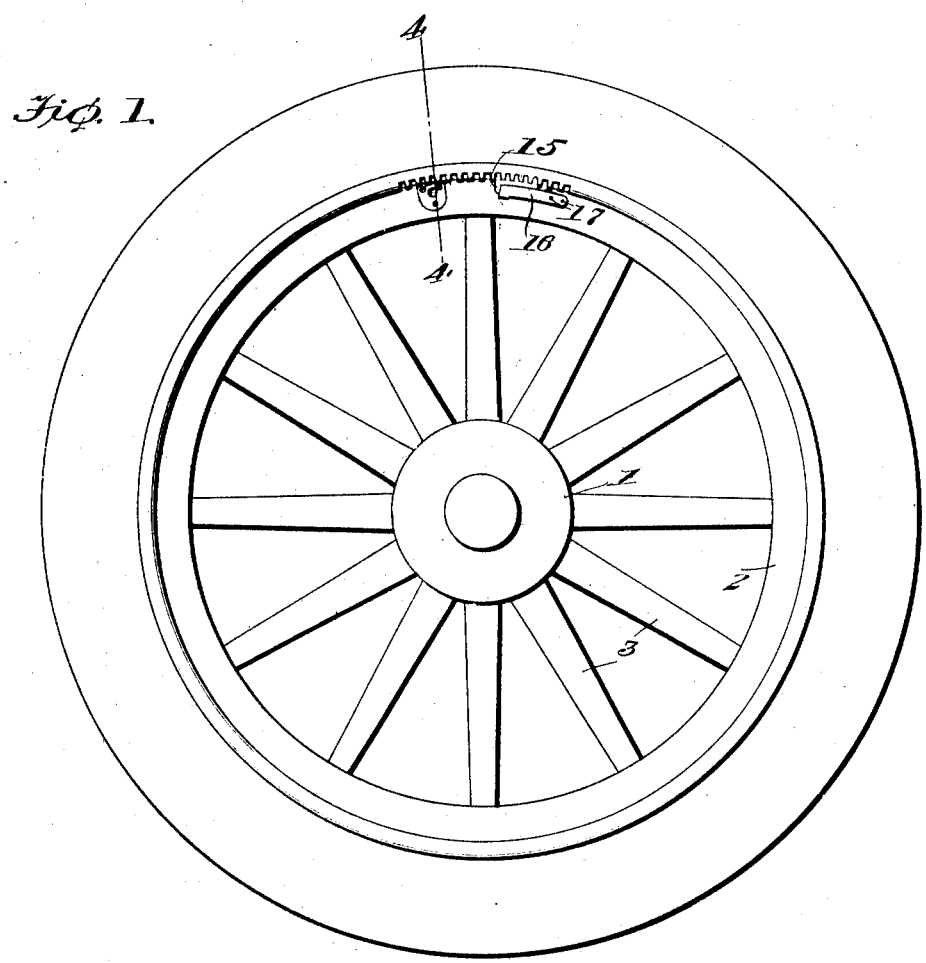
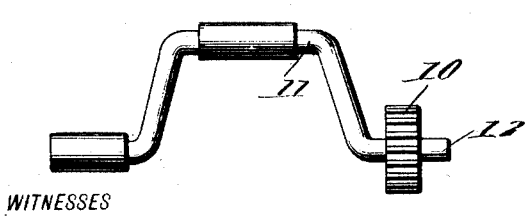
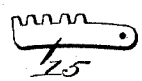
WITNESSES
INVENTOR
A. O. Kunert,
BY
ATTORNEYS

A. O. KUNERT.
TIRE FASTENER.
APPLICATION FILED SEPT. 18, 1919.

1,373,009.

Patented Mar. 29, 1921.
3 SHEETS—SHEET 2.

WITNESSES

INVENTOR
A. O. Kunert,
BY
ATTORNEYS

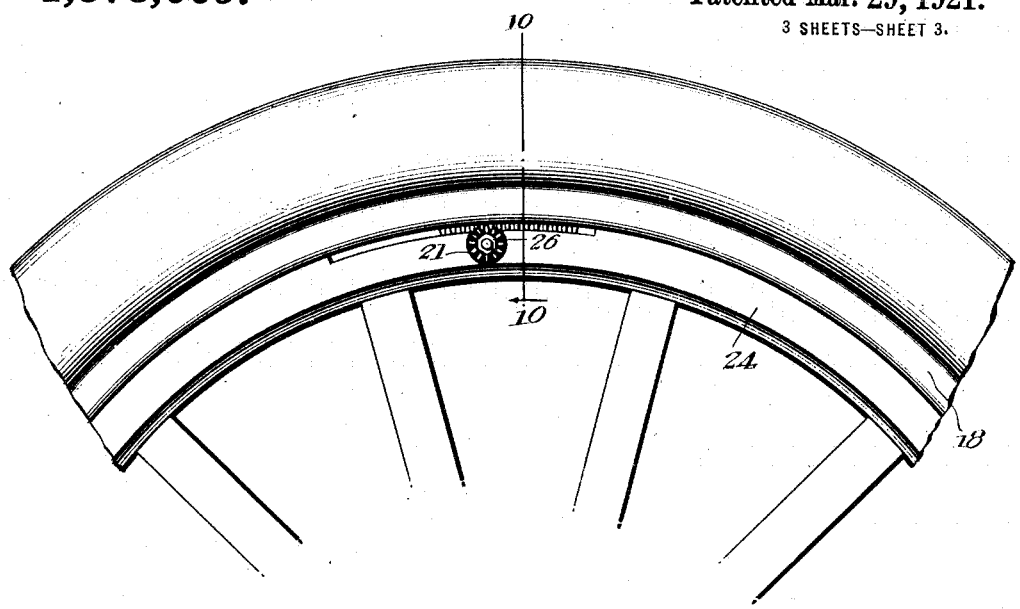
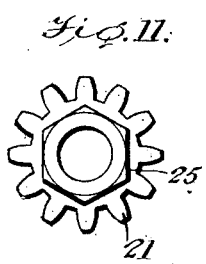
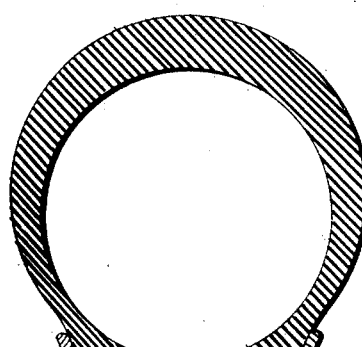
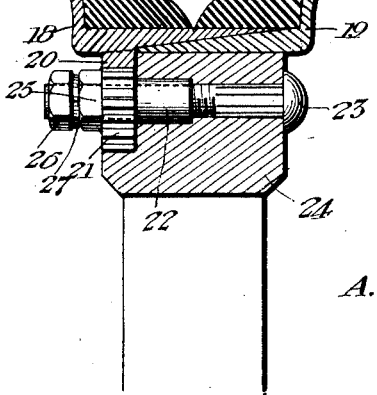

UNITED STATES PATENT OFFICE.

ARTHUR O. KUNERT, OF FARGO, NORTH DAKOTA, ASSIGNOR OF ONE-HALF TO THOMAS H. McENROE, OF FARGO, NORTH DAKOTA.

TIRE-FASTENER.

1,373,009.	Specification of Letters Patent.	Patented Mar. 29, 1921.

Application filed September 18, 1919. Serial No. 324,312.

*To all whom it may concern:*

Be it known that I, ARTHUR O. KUNERT, a citizen of the United States, and a resident of Fargo, in the county of Cass and State of North Dakota, have invented certain new and useful Improvements in Tire-Fasteners, of which the following is a specification.

My invention is an improvement in tire fasteners, and has for its object to provide a fastener of the character specified wherein a sectional rim is provided, consisting of sections slidable upon each other and having interengaging means for constraining them to move toward and from each other when they are moved circumferentially with respect to each other, to cause them to grasp the holding beads of the tire or to release the same, and wherein means is provided for moving the said sections circumferentially with respect to each other in either direction, and for locking them against reverse movement.

In the drawings:

Figure 1 is a side view of a wheel having the improved fastener, with parts in section;

Fig. 6 is a front elevation of the locking dog;

Fig. 7 is a similar view of the holder for the dog;

Fig. 8 is a side elevation of the pinion and tool;

Fig. 9 is a side view of another embodiment of the invention;

Fig. 10 is a section on line 10—10 of Fig. 9;

Fig. 11 is a front view of the pinion;

Fig. 12 is a detail view of the nut;

Fig. 13 is a detail view of the lock washer.

Figure 2:
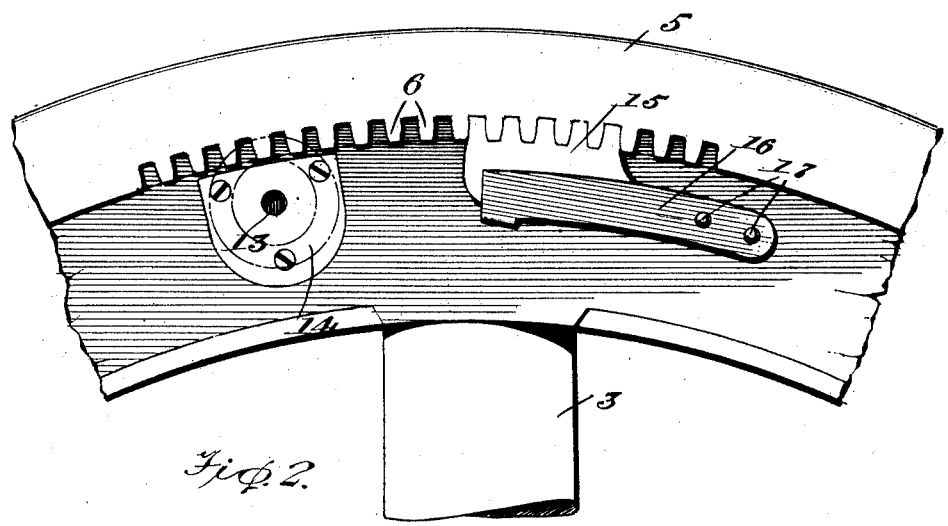
Fig. 2 is an enlarged sectional detail of a portion of Fig. 1.

The present embodiment of the invention is shown in connection with a wheel consisting of the usual hub 1, the felly 2 and the spokes 3 connecting the hub and the felly. The rim is composed of an inner section 4 and an outer section 5 which is slidable upon the inner section, and these sections have suitable flanges at their remote edges for engaging the beads of a tire 6 to hold the tire in place on the wheel. These flanges may be as shown in Figs. 4 and 5, or they may be hooked to engage the clencher type of tire, or they may be made smaller to support a demountable rim.

Figure 3:
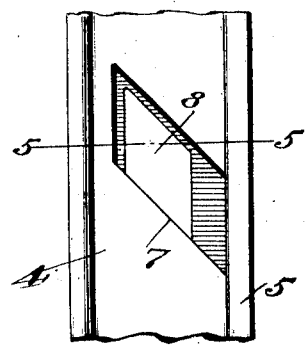
Fig. 3 is a view looking at the outer side of a portion of the rim.
Figure 4:
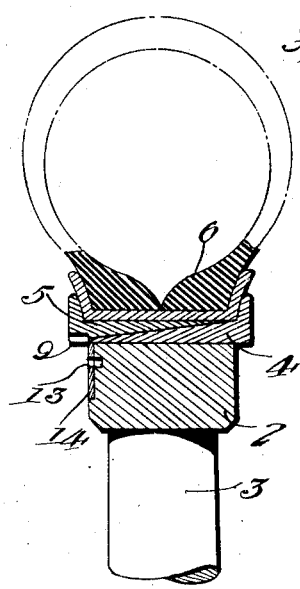
Fig. 4 is a section on the line 4—4 of Fig. 1.
Figure 5:
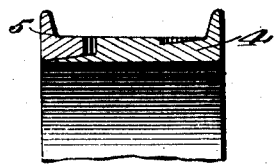
Fig. 5 is a section on the line 5—5 of Fig. 3.

Referring to Figs. 4 and 5, it will be seen that the abutting faces of the sections 4 and 5 are inclined or beveled, so that when the sections are moved together the outer section will be moved outward. The inner section 4 has a series of inclined slots or openings 7, all of the slots inclining in the same direction and extending from that edge of the section remote from the tire engaging flange to near the other edge. The slots are adapted to be engaged by lugs 8 on the section 5, the said lugs having their opposite side walls inclined as shown in Fig. 3, and it will be evident that when the sections are moved circumferentially with respect to each other they will be moved toward or from each other through the interengagement of the lugs and slots, the inclined abutting surfaces of the slots and lugs constraining the lateral movement of the sections during their circumferential movement.

The section 5 is made to move with respect to the section 4 which is held on the felly, and in order to move this section it is provided with a series of rack teeth 9. These teeth are adapted to be engaged by the teeth of the pinion 10 supported by a brace 11, the pinion being held on the chuck portion of the brace in any suitable or desired manner. The chuck portion of the brace, as clearly shown in Fig. 8, is extended beyond the pinion at 12 and this extension is adapted to engage a central opening 13 in a plate 14 which is secured to the side face of the felly at a suitable distance from the rack teeth, such that when the extension 12 is engaged with the opening 13 the teeth of the pinion will mesh with the rack teeth.

In order to hold the sections from accidental movement, a holding dog 15 is provided, the said dog being supported by a plate 16 which is resilient and is secured to the felly as indicated at 17. As shown in Fig. 7, the plate 16 has a laterally extending catch for receiving the dog, and the dog is pivoted to the felly adjacent to the connected end of the resilient plate. The plate acts as a spring to hold the dog in engagement with the rack teeth.

In order to remove the tire the section 5 may be turned in the proper direction to cause the sections to move away from each other. This loosens the grip on the holding beads of the tire and also contracts the rim so that the tire may be easily removed.

In placing the tire, it is placed on the rim with the sections separated. The section 5 is then turned in the proper direction to tighten the holding flanges on the beads. The plate 14 is held to the felly by means of screws, as shown.

In the construction of Figs. 9 to 12, inclusive, the rim is composed of sections 18 and 19, the sections being slidable upon each other and the section 19 resting upon the felly. The section 18 has rack teeth 20 which are engaged by a pinion 21. This pinion has a hub 22 which engages an opening in the felly 24 of the wheel, and a bolt 23 passes through the hub, the hub being threaded on to the bolt. The pinion also has a polygonal portion 25 for engagement by a wrench to turn the same, and a lock nut 26 is threaded on to the bolt adjacent to the polygonal portion 25, a lock washer 27 being arranged between the bolt and the polygonal portion.

I claim:

A tire rim comprising a pair of sections wedge shaped in cross section and formed with retaining flanges, one section being formed with a series of inclined slots and the other section carrying projections engaged within said slots whereby when the sections are relatively rotated said sections will be drawn together, rack teeth formed on one section, a threaded bolt, and a pinion threaded onto said bolt and meshing with said teeth, said pinion being rotatable to effect relative circumferential movement of the sections and the threading of the pinion permitting movement thereof laterally with the associated section.

ARTHUR O. KUNERT.